No. 708,858. Patented Sept. 9, 1902.
J. W. BROWN, Jr.
POLISHING MACHINE.
(Application filed Mar. 10, 1902.)
(No Model.) 2 Sheets—Sheet 1.
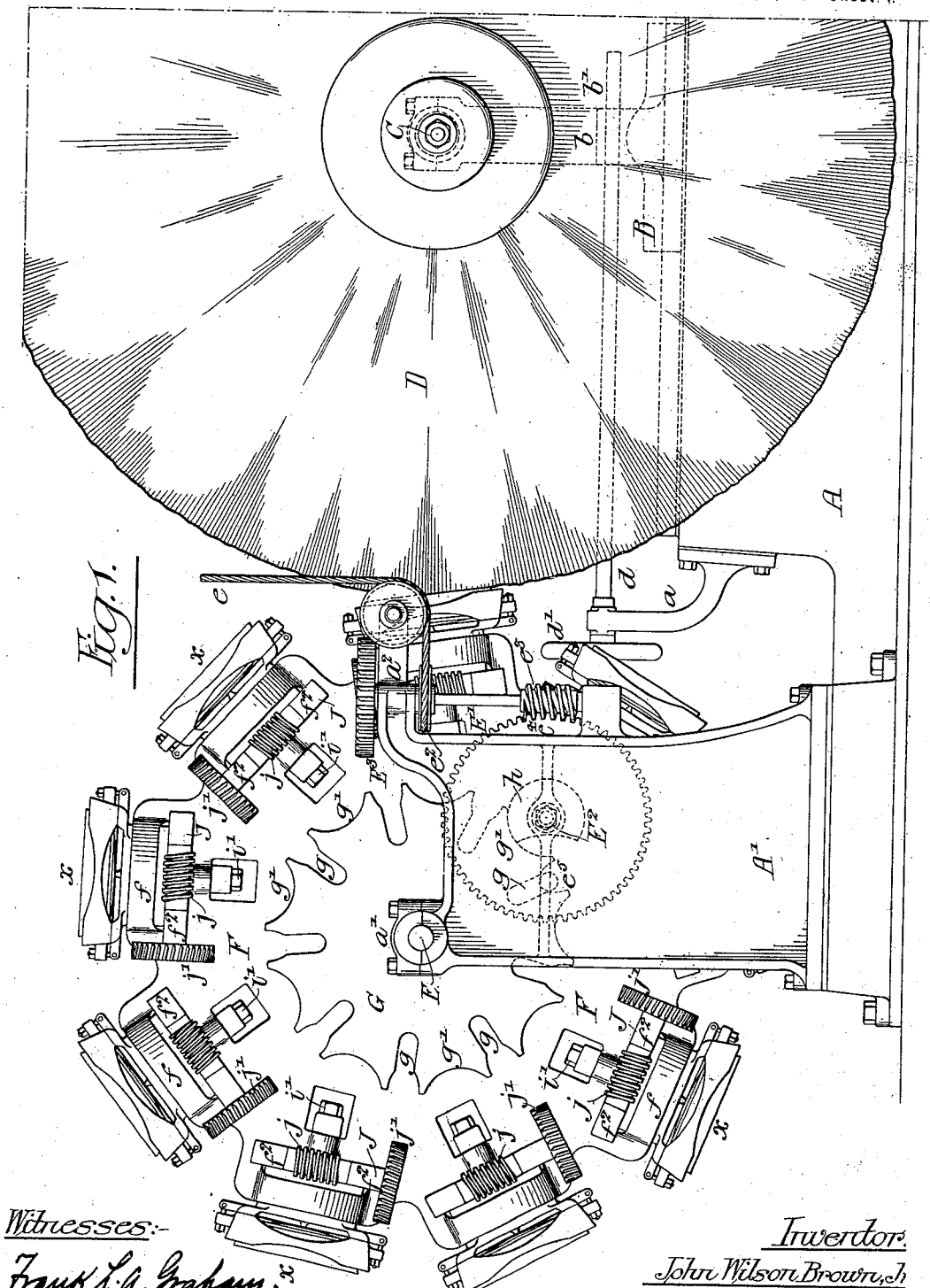

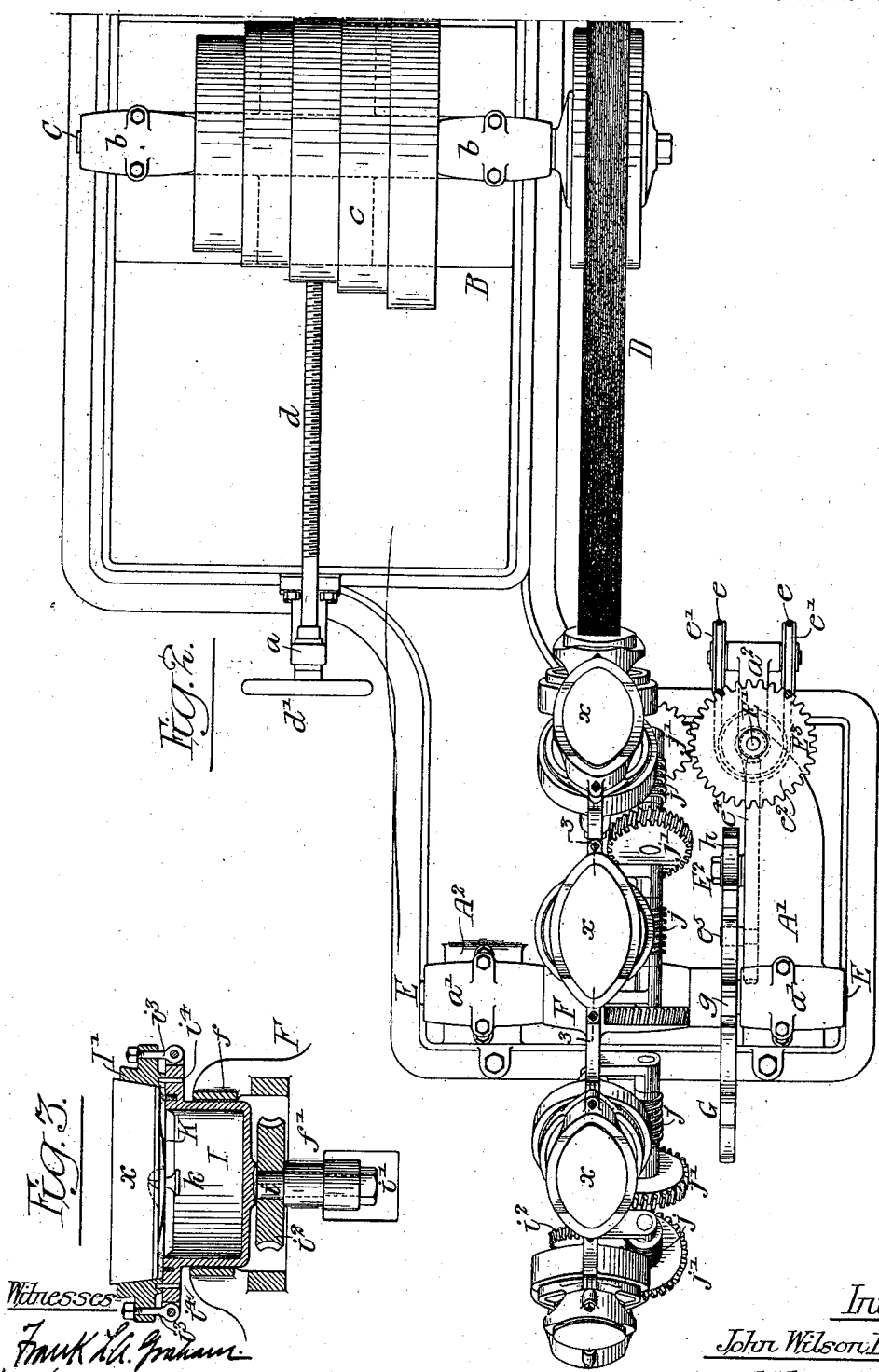

UNITED STATES PATENT OFFICE.

JOHN WILSON BROWN, JR., OF PHILADELPHIA, PENNSYLVANIA.

POLISHING-MACHINE.

SPECIFICATION forming part of Letters Patent No. 708,858, dated September 9, 1902.

Application filed March 10, 1902. Serial No. 97,489. (No model.)

*To all whom it may concern:*

Be it known that I, JOHN WILSON BROWN, Jr., a citizen of the United States, residing in Philadelphia, Pennsylvania, have invented certain Improvements in Polishing-Machines, of which the following is a specification.

My invention relates to certain improvements in machines for polishing metal surfaces, and especially machines for polishing the surfaces of flat-irons.

The object of my invention is to construct a machine in which a number of sad-irons or other articles can be polished, the sad-irons being held in chucks on the rotating frame, so that the sad-irons are brought into contact one after another with the polishing-wheel, the irons being rotated as they come in contact with the wheel, as fully described hereinafter.

In the accompanying drawings, Figure 1 is a side view of my improved polishing-machine. Fig. 2 is a plan view; and Fig. 3 is a section on the line 3 3, Fig. 2.

A is the base of the machine, on which is a sliding frame B, having bearings $b\ b$ for the driving-shaft C. On this shaft is a step-pulley $c$ and a polishing-wheel D. This wheel is made up of a number of layers of fabric suitably clamped in the ordinary manner.

$d$ is a screw having one end mounted in a bearing $a$ on the frame A, and this screw passes through a nut $b'$ on the sliding frame B. On the screw is a hand-wheel $d'$, by which it is turned, so that the polishing-wheel D can be moved toward and from the work.

A' A² are standards carrying the bearings $a'$ for the shaft E, on which the carrying-frame F is mounted. The carrying-frame F is driven through the following means:
$e$ is a belt leading from any suitable power-shaft. This belt passes around guide-wheels $e'$ on a bracket $a^2$, projecting from the frame A', and the belt then passes around a wheel $e^2$ on the vertical shaft E', having at its lower end a worm $e^3$, meshing with a worm-wheel $e^4$ on the stud E², projecting from the standard A'. On the worm-wheel $e^4$ is a pin $e^5$, which enters the slots $g$ of the star-wheel G, also secured to the shaft E, so that on each revolution of the worm-wheel the pin $e^5$ will turn the star-wheel G one-ninth of a revolution.

In order to lock the carrier-frame F to the position in which it is turned, I mount on the stud E² a disk $h$, which is partly cut away. The edge of this disk fits snugly the curved recess $g'$ in the face of the star-wheel G, so that as soon as the pin $e^5$ leaves one of the slots $g$ the disk $h$ will lock the star-wheel from revolving and hold it in the locked position until the pin $e^5$ enters the next slot. At this time the cut-away portion of the disk $h$ will be opposite the star-wheel, allowing the star-wheel to move a given distance until the disk engages the next curved recess of the wheel. The star-wheel and the carrying-frame are so proportioned that the sad-irons are brought into position one at a time to be acted upon by the polishing-wheel and held in position for the desired length of time. In the present instance the carrying-frame has nine chucks for the sad-irons, and there are consequently nine slots in the star-wheel. The chucks for the sad-irons are constructed as follows: Mounted in a socket $f$, Fig. 3, in a carrying-frame F is a cup-shaped chuck I, having a spindle $i$, which passes through a bearing $f'$ in the frame F and is provided with a nut $i'$ at its inner end. On the spindle $i$ is a worm-wheel $i^2$, with which meshes a worm $j$ on the shaft J, mounted in bearings $f^2$ on the frame F. On the end of the shaft J is a peculiarly-shaped gear-wheel $j'$, having teeth beveled at one end, which meshes with a gear-wheel E³ on the vertical shaft E'. This wheel E³ also has teeth beveled at one end, so that when the frame F is turned the teeth of the wheel $j'$ will readily mesh with the teeth of the wheel E³. By this arrangement the chuck I does not revolve except when the wheel $j'$ is in gear with the wheel E³ and this is at a point opposite the polishing-wheel. The chuck I has a ring I', which is held to the chuck I by bolts $i^3$ and is also alined by pins $i^4$, so that the ring will be held rigidly to the chuck. The ring preferably fits the object which it is intended to polish. In the present instance this object is the body portion of a detachable-handle sad-iron. The body portion $x$ is held in place by a grip $k$ on a cross-bar K, secured to the chuck I, the grip being similar to that of an ordinary detachable handle of a sad-iron. This grip engages the cross-bar of the body portion of the sad-iron and holds it rigidly in the ring of the chuck, and by simply releasing the grip k the ring can be detached and another placed in its stead. If it is desired to polish other sizes of irons or articles of other shapes, then the rings I' are removed and rings of other shape substituted therefor.

It will be understood that while the invention is especially applicable for polishing sad-irons it may be used for polishing other shapes by simply modifying the shape of the chuck.

The operation is as follows: After the several sad-irons are placed in the chucks the machine is set in motion and the polishing-wheel D adjusted so as to be in proper position to polish the surface of each iron as it comes into position. The shaft E' is driven through the belt e, and the shaft E, on which the carrying-frame is mounted, is turned at intervals and locked through the star-wheel driving-gear described above. As each chuck comes into polishing position the wheel j', carried by the frame F, meshes with the wheel $E^3$ on the shaft E', so that this one chuck is rotated through the medium of the said wheels and the worm j and worm-wheel $i^2$. The chuck is rotated in this position until the frame F is moved again by the star-wheel gear, when one chuck is moved out of gear with the wheel $E^3$ and out of contact with the polishing-wheel and another one takes its place. The operator can remove the irons after they are polished during the intervals that the frame F stops and can adjust other irons in the chucks from which the polished irons have been removed.

I claim as my invention—

1. The combination of a polishing-wheel, a shaft, a carrying-frame on said shaft, chucks on said carrying-frame for holding the irons or other articles to be polished, and means for intermittently rotating said frame, substantially as described.

2. The combination of a polishing-wheel, a shaft, a carrying-frame on said shaft, chucks mounted on said carrying-frame for holding irons or similar articles, a driven shaft mounted in fixed bearings, and means for connecting said driven shaft with a chuck when opposite the polishing-wheel, substantially as described.

3. The combination of a polishing-wheel, a shaft, a carrying-frame on said shaft, rotatable chucks mounted on the carrying-frame, said chucks arranged to hold an iron or similar article to be polished, a driven shaft, gearing between the driven shaft and the carrier-shaft for intermittently turning the said carrier-frame, and a gear on the said driven shaft, a series of gears on the frame for turning the chucks, said gears being so arranged as to mesh with the gear on the driven shaft when opposite the polishing-wheel, substantially as described.

4. The combination of a polishing-wheel, a shaft, a carrying-frame on said shaft, rotatable chucks on the carrying-frame, a series of shafts mounted on the frame and each having a worm, a worm-wheel on each chuck meshing with the worm on one of the said worm-shafts, a gear on the said worm-shaft, a driven shaft mounted in fixed bearings and having a gear-wheel with which the gear-wheels on each of the worm-shafts of the carrying-frame engage when opposite the polishing-wheel, so as to rotate the chucks, and means for intermittently rotating the carrying-frame, substantially as described.

5. The combination of a polishing-wheel, a shaft, a carrying-frame mounted on said shaft, chucks on the carrying-frame for the irons or other articles to be polished, means for rotating the chucks when opposite the polishing-wheel, a star-wheel on the shaft of the carrying-frame, a stud, a wheel on said stud having a pin entering the slots of the star-wheel and having a disk for locking the star-wheel, with means for imparting motion to the said pin-wheel and disk, substantially as described.

6. The combination of a polishing-wheel, a standard, a shaft mounted thereon, a carrying-frame on said shaft, rotatable chucks mounted on said frame, a driven shaft, a worm thereon, a worm-wheel meshing with said worm, a star-wheel lock-gear through which the carrier-frame shaft is driven from the worm-wheel, and means for imparting rotary movement to each chuck from the said driving-shaft when the particular chuck is opposite the polishing-wheel, substantially as described.

7. The combination in a polishing-machine, of a carrying-frame, a socket and a bearing in said frame, a chuck mounted in the said socket and having a spindle extending through the bearing, a nut on the spindle for confining the chuck in position, a worm-wheel on the spindle, a worm-shaft, a worm on said shaft meshing with the worm-wheel, and means for turning said worm-shaft so as to rotate the chuck, substantially as described.

8. The combination of a polishing-wheel, a carrying-frame, a socket and a bearing, a chuck mounted in said socket and having a spindle mounted in the bearing, means for rotating said chuck, and a ring shaped to the article to be polished and secured to the chuck, substantially as described.

9. The combination of a polishing-wheel, a frame, a socket in the frame, a chuck mounted in the socket, means for rotating the chuck, a ring detachably secured to the chuck, a cross-bar, a grip on the cross-bar arranged to engage the cross-bar of the iron when placed in the socket so as to hold said iron in position, substantially as described.

10. The combination in a polishing-machine, of a fixed shaft, a gear-wheel thereon having teeth beveled at one end, a rotatable frame carrying chucks, means for revolving said chucks, a gear-wheel for driving said means, said gear-wheel having teeth beveled at one end and so arranged that when the frame F is rotated the gear-wheel on the movable frame will mesh with the gear-wheel on the fixed frame, substantially as described.

11. The combination in a polishing-machine, of the fixed frame, a vertical shaft thereon having at its upper end a gear-wheel, the teeth of which are beveled at one end, a polishing-wheel, a rotatable frame, a series of chucks carried by said frame, independent means for turning each chuck, a gear-wheel forming part of said means, the teeth of said gear-wheel being beveled at one end, with means for intermittently rotating the chuck-frame so that the wheels of the chuck mechanism will mesh with the gear-wheel mounted on the shaft having its bearings in the fixed frame, substantially as described.

In testimony whereof I have signed my name to this specification in the presence of two subscribing witnesses.

JOHN WILSON BROWN, JR.

Witnesses:
WILLIAM E. BRADLEY,
JOS. H. KLEIN.